J. DE FALCO.
FARM AND GARDEN IMPLEMENT.
APPLICATION FILED JUNE 23, 1915.
1,161,627.
Patented Nov. 23, 1915.
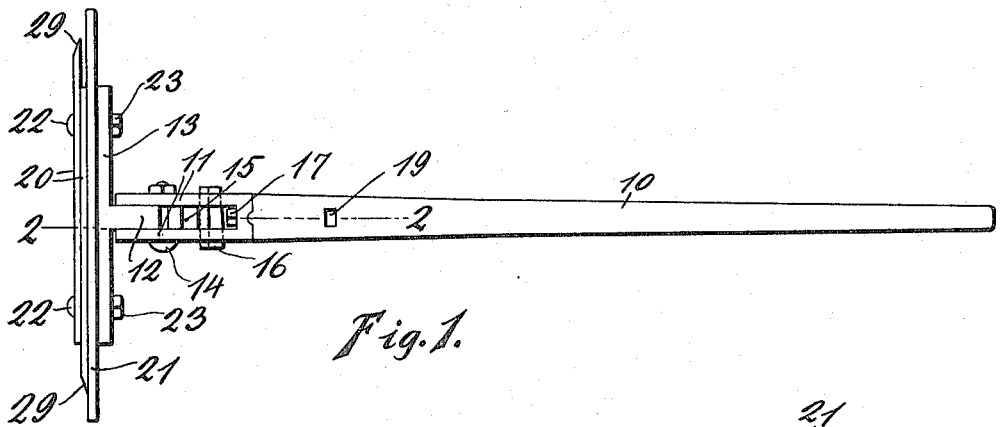
Fig. 1.
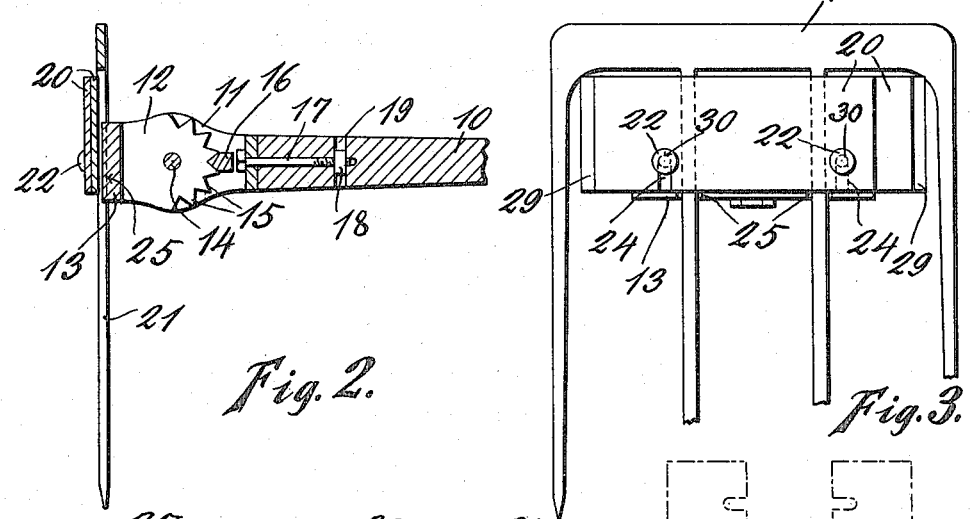
Fig. 2.
Fig. 3.
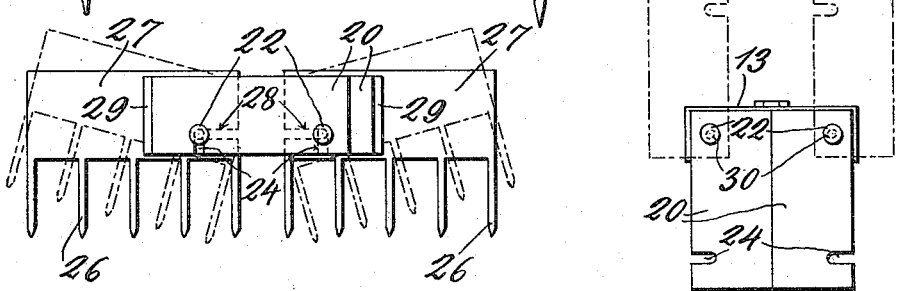
Fig. 4.
Fig. 5.
Inventor
Joseph de Falco
By Milo B. Stevens & Co.
Attorneys.

UNITED STATES PATENT OFFICE.

JOSEPH DE FALCO, OF VINELAND, NEW JERSEY.

FARM AND GARDEN IMPLEMENT.

1,161,627.　　　　　Specification of Letters Patent.　　Patented Nov. 23, 1915.

Application filed June 23, 1915. Serial No. 35,962.

*To all whom it may concern:*

Be it known that I, JOSEPH DE FALCO, a citizen of the United States, residing at Vineland, in the county of Cumberland and State of New Jersey, have invented certain new and useful Improvements in Farm and Garden Implements, of which the following is a specification.

This invention relates to farm and garden implements which are interchangeable, a holder being provided which is designed to attach to a handle different kinds of tool blades, such as a hoe, a rake, etc.

The invention has for its object to provide a novel and improved holder for the purpose stated, which, in addition to its ordinary function, is adjustable so that it may be used as a hoe blade.

The object stated is attained by means of a combination and arrangement of parts to be hereinafter described and claimed, reference being had to the accompanying drawing in which—

Figure 1 is a plan view of the implement; Fig. 2 is a sectional detail on the line 2—2 of Fig. 1; Fig. 3 is a front elevation of the implement; Fig. 4 is a front elevation of the implement equipped with a different kind of tool, and Fig. 5 is a front elevation showing the holder set to serve as a hoe blade.

Referring specifically to the drawing, 10 denotes the handle of the implement, the same having secured to its outer end spaced ears 11, between which latter is mounted a segmental head 12 on the back of a plate 13. A bolt 14, passing through the ears 11 and the head 12, provides a pivotal connection between the head plate 13 and the handle 10. In order to lock the head plate and the handle together, the edge of the head 12 has ratchet teeth 15, and the ears 11 carry a transverse key 16 adapted to be inserted between two adjacent ones of said teeth, as shown in Fig. 2, the key being suitably shaped on one side to fit between the teeth. In the ears 11 are alined openings in which the key seats. Upon withdrawing the key, the angle of the head plate 13 to the handle 10 may be changed as desired, and upon inserting the key into locking position, the plate is securely locked and held rigid to the handle. The ears 11 are secured to the handle 10 by a bolt 17 entering the handle lengthwise at its outer end and secured by a nut 18 seating in a transverse recess 19 in the handle.

The head plate 13 operates, in conjunction with a pair of clamping plates 20, to secure the blade of the implement. Figs. 1 to 3 show a rake or scratching hoe 21. To secure this tool member, the plates 20 are placed one on top of the other, and the member is placed between the inner one of said plates and the plate 13, and clamped between said parts by bolts 22 passing therethrough and secured by nuts 23. The tool member is positioned so that the parts 20 and 13 engage the upper ends of two tines, the bolts 22 passing between the tines, and the plates 20 having registering slots 24 and bolt holes to accommodate the bolts. The outer face of the plate 13 has vertical grooves 25 in which the aforementioned tines seat. The tool member is thus securely held and it can be easily and quickly attached and removed. The angle of the tool member can also be varied by the hereinbefore described adjustable connection between the handle 10 and the plate 13.

Various kinds of hoe blades and similar gardening tools may be used in connection with the fastening means herinbefore described. Fig. 4 shows the implement equipped with two small scratching hoes or rakes 26 spaced at their inner ends so that they may work two sides of small plants. These tool members are secured in the same manner as the member 21. However the tines do not seat between the parts 13 and 20, but only the rake head 27, the inner edges of the latter having slots 28 to receive the bolts 22. The members 26 may be set in a straight line as shown in full lines, or they may be placed at an angle as shown dotted. The top edge of the head 27 may be sharp so that when the same is reversed, it may be used as a weeding hoe. The plates 20 are also designed for use as a hoe blade by placing them side by side as shown in Fig. 5, and securing the same to the head plate 13 by the bolts 22. In this position of the plates, they project downward from the head plate. One edge of each plate 20 is sharp as indicated at 29, and these edges are so located that they are in alinement when the two plates are placed together side by side to serve as a hoe-blade. The plates have apertures 30 to receive the bolts 22 in the last described position, and they can be swung into various positions according to the character of the work, as shown dotted in Fig. 5.

When the plates 20 are arranged as shown in Figs. 1 to 4, the slots 24 register with the bolt holes 30.

I claim:—

1. A tool-holder comprising a handle, a head plate at the outer end of the handle, and overlapping tool-clamping plates opposite and carried by said head plate, said tool-clamping plates being adjustable to seat side by side on the head plate, and having sharpened edges which are in alinement when the plates are in the last-mentioned position.

2. A tool-holder comprising a handle, a head plate at the outer end of the handle, and overlapping tool-clamping plates opposite and carried by said head plate, said tool-clamping plates being adjustable to seat side by side on the head plate, and to project therefrom, the projecting portions of said plates having sharpened edges which are in alinement.

In testimony whereof I affix my signature in presence of two witnesses.

JOSEPH DE FALCO.

Witnesses:
FRANK BALSAMO,
JOSEPH LAUDADIO.

Copies of this patent may be obtained for five cents each, by addressing the "Commissioner of Patents Washington, D. C."